United States Patent [19]
Roy et al.

[11] 3,865,709
[45] Feb. 11, 1975

[54] CARBON ACTIVITY METER

[76] Inventors: Prodyot Roy, 12980 Foothill Ln., San Jose, Calif. 95070; Jan L. Krankota, 201 Herlong Ave., San Jose, Calif. 95123

[22] Filed: Nov. 2, 1973

[21] Appl. No.: 412,396

[52] U.S. Cl........... 204/195 R, 204/1 T, 204/195 P, 136/86 R, 136/120 FC
[51] Int. Cl. ............................................ G01n 27/46
[58] Field of Search ............ 204/1 T, 195 R, 195 S; 136/86 R, 86 D, 86 PD, 120 FC, 153

[56]  References Cited
UNITED STATES PATENTS

| | | | |
|---|---|---|---|
| 3,259,524 | 7/1966 | Fay et al. ........................... | 136/86 R |
| 3,378,478 | 4/1968 | Kolodney et al. ................ | 204/195 S |
| 3,523,066 | 8/1970 | Morris et al. ...................... | 204/1 T |
| 3,679,551 | 7/1972 | Kolodney ......................... | 204/195 R |
| 3,700,568 | 10/1972 | Fuhrman .......................... | 204/195 R |
| 3,715,296 | 2/1973 | Salzano et al. ................... | 204/195 R |
| 3,718,546 | 2/1973 | Salzano et al. ................... | 204/195 R |
| 3,769,189 | 10/1973 | Long ................................. | 204/195 R |
| 3,773,641 | 11/1973 | Fitterer ............................. | 204/195 S |

*Primary Examiner*—T. Tung
*Attorney, Agent, or Firm*—John A. Horan; F. A. Robertson; L. E. Carnahan

[57]     ABSTRACT

A carbon activity meter utilizing an electrochemical carbon cell with gaseous reference electrodes having particular application for measuring carbon activity in liquid sodium. The electrolyte container is electroplated with a thin gold film on the inside surface thereof, and a reference electrode consisting of CO/CO$_2$ gas is used.

2 Claims, 1 Drawing Figure

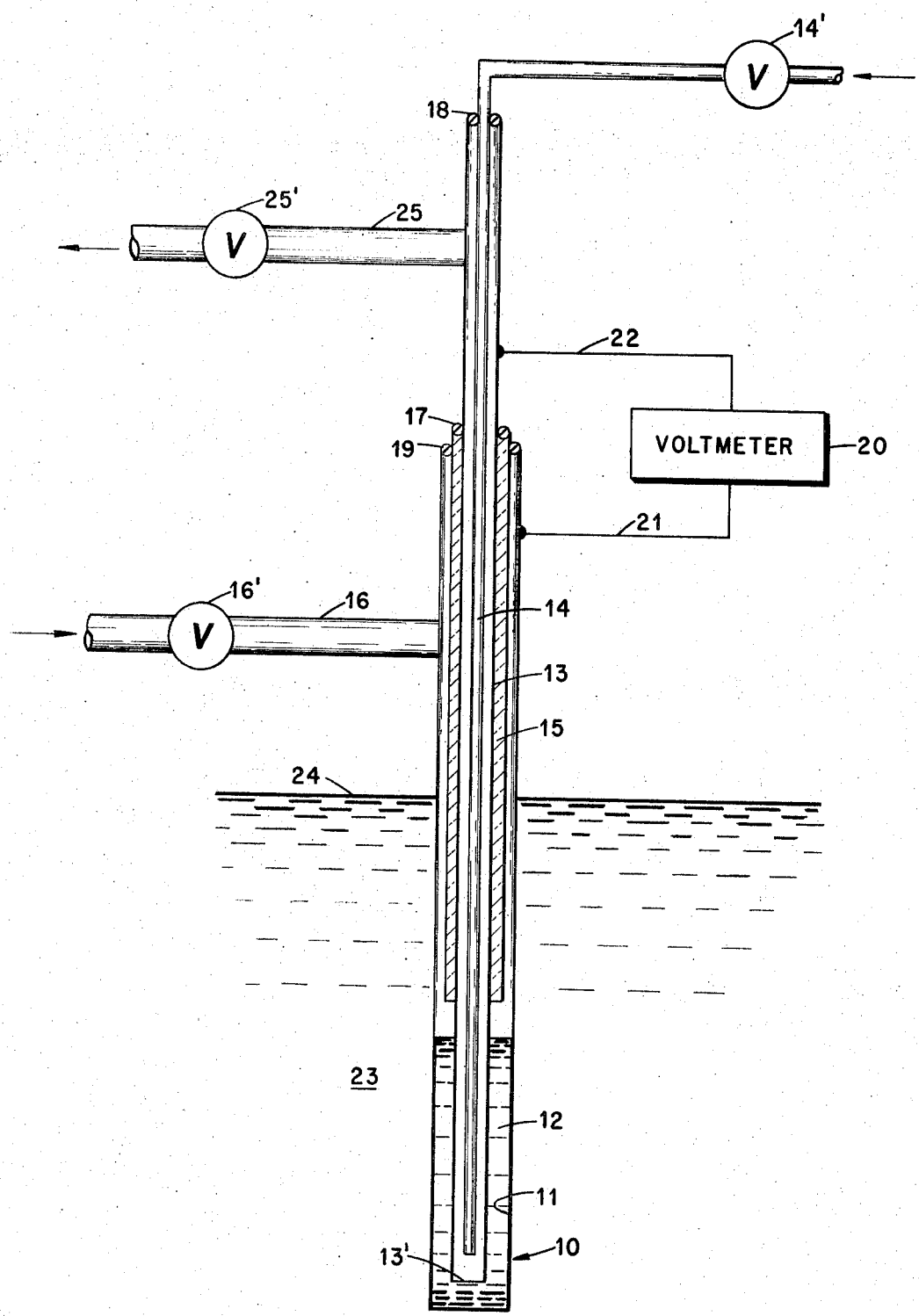

CARBON ACTIVITY METER

BACKGROUND OF THE INVENTION

The invention described herein was made in the course of, or under, Contract No. AT(04-3)-189, Project Agreement No. 60, with the United States Atomic Energy Commission.

Monitoring of carbon activity in sodium cooled reactors, such as the Liquid Metal Fast Breeder Reactor (LMFBR) is essential for successful operation of breeder type reactors, due to carbon from the primary components, such as the stainless steel core material, being transported to the secondary components, such as the intermediate heat exchanger (IHX) causing damage to these components, such as embrittlement.

The prior known carbon monitoring devices are too complicated and/or do not measure true carbon activities in liquid sodium. The prior electrochemical carbon meters with molten alkali metal carbonate electrolytes are unacceptable because of:

1. Corrosion of the iron container by the molten carbonate electrolyte.
2. Shorting of the cell due to formation of iron whiskers between two electrodes, due to corrosion of iron by carbonates.
3. Use of graphite or graphitized iron as a reference electrode, tends to make the cell irreversible.
4. Graphite or graphitized iron electrodes are susceptible to breakage due to thermal and/or mechanical shocks. Thus, a need exists for an effective means for monitoring carbon activity in sodium cooled reactors.

SUMMARY OF THE INVENTION

The present invention is directed to a carbon activity meter utilizing an electrochemical carbon cell with gaseous reference electrodes, and is constructed so as to eliminate the above-referenced problems associated with the prior known electrochemical carbon meters.

Therefore, it is an object of the invention to provide a carbon activity meter for measuring carbon activities in liquid sodium and utilizes an electrochemical carbon cell with gaseous reference electrodes.

A further object of the invention is to provide an electrochemical carbon meter having a film of metal thereon which eliminates corrosion and prevents the forming of short circuits in the cell.

Another object of the invention is to provide a carbon activity meter which uses a gaseous reference electrode thereby eliminating breakage of the electrode due to thermal or mechanical shocks.

Other objects of the invention will become apparent from the following description and accompanying drawing.

BRIEF DESCRIPTION OF THE DRAWING

The single FIGURE illustrates an embodiment of the gas reference carbon meter made in accordance with the invention.

DESCRIPTION OF THE INVENTION

The invention is directed to an apparatus utilizing an electrochemical carbon cell having particular application for measuring carbon activities in liquid sodium. The apparatus broadly includes an electrolyte container having a thin gold film on the interior surface thereof, produced by electroplating techniques followed by a heat treatment to reduce the thickness of the gold film, and a reference electrode consisting of $CO/CO_2$ gas, for example.

The gas reference electrochemical carbon meter illustrated in the drawing consists of cup-like member 10 forming an electrode and made of nickel having a thickness of 0.005 in., for example, with a thin film of gold, indicated at 11, electroplated on the inside surface thereof. The gold plating or film 11 is of a thickness of 0.001 in., for example, and is required to prevent reaction of the nickel with the molten electrolyte 12 contained in the lower portion of cup-like member 10 which could be either a mixture of $Na_2CO_3$, $K_2CO_3$, and $Li_2CO_3$ or $CaCl_2 + CaC_2$. A gaseous reference electrode composed of a tube 13 constructed of nickel of a 0.005 in. thickness, for example, having a closed lower end indicated at 13' and which is gold-plated to a thickness of 0.001 inches on the outside surface thereof, at least at the lower portion which is immersed in the molten electrolyte 12. The activity of carbon at the reference electrode or tube 13 is maitained by passing a fixed ratio (5 to 95) of CO and $CO_2$ gas through the inside of the tube 13 through a capillary inlet tube 14 of quartz, for example, which extends into tube 13 and terminates at one end in a spaced relation with respect to the closed end 13' of tube 13, the outer end being connected to a CO and $CO_2$ gas supply, not shown, via a valve assembly 14'. An electrical insulator 15 of either quartz or magnesia, for example, is placed between electrode or tube 13 and cup-like member or electrode 10 to prevent shorting. Note that insulator terminates above the molten electrolyte 12. In order to prevent rapid vaporization of the electrolyte 12 a moderate argon cover pressure is maintained over the electrolyte and which is supplied to the upper portion of cup-like member 10 via an inlet conduit 16 having a control valve 16' therein connected to an argon supply, not shown. Seals, such as high temperature silicone rubber, as indicated at 17, 18 and 19, serve to prevent contamination of the cover gas and the reference gas by air or moisture. A high impedance voltmeter 20 connected via leads 21 and 22 to electrodes 10 and 13, respectively, measures the electrochemical potentials between the two electrodes. The thus described carbon meter is positioned in liquid sodium 23 to the level indicated at 24 which is contained in a reactor vessel, not shown. A reference gas discharge conduit 25 having a valve 25' therein is connected to tube or electrode 13 at the upper end portion of the electrode.

The apparatus described above forms a simple concentration cell of the type:

| $CO/CO_2$ (Ref) | Au | Molten Li/Na/K Carbonate | Au | C in Solution in Na |

The nickel cup 10 and the electrolyte 12 will be in equilibrium with the carbon activity in sodium, whereas the reference gas ($CO/CO_2$) will be in equilibrium with the nickel tube 13 carrying the reference gas.

Consequently, the measured value of the open circuit potential is proportional to the measured activity of carbon in liquid sodium:

$$EMF_{(in\ volts)} = RT/2F \log_e A_{C\ in\ Na}/A^°_{C\ reference}$$

where $F$ = Faraday constant $T = °K$
$R = $ Gas constant

The activity of carbon at the reference electrode can be calculated from the reaction:

$$2 CO_{(g)} \underset{}{\overset{K}{\rightleftarrows}} CO_{2(g)} + c_{(s)}$$

The equilibrium $K =$ $P_{CO_2} A_c / P_{CO}^2$
constant

Hence, knowing the equilibrium constant K the activity of carbon can be fixed at any temperature.

It has been demonstrated that at equilibrium the potential of the above-described cell embodiment is determined by the over-all reaction:

$$CO + CO_3^{2-} \rightleftarrows 2 CO_2 + 2 e^-$$

The above-described carbon activity meter provides the following novel features, thereby advancing the state-of-the-art:

1. Use of the gold plated cup to hold the molten electrolyte eliminates corrosion and premature failure of the cells due to loss of the electrolyte.

2. The gold plating eliminates dissolution of iron or nickel which forms whiskers and short circuits the cell.

3. Use of a gaseous reference electrode, eliminates the breakage of graphite or graphitized iron electrodes due to thermal and mechanical shocks.

While a particular embodiment of the invention has been illustrated and described, modifications will become apparent to those skilled in the art, and it is intended to cover in the appended claims all such modifications as come within the spirit and scope of the invention.

What we claim is:

1. A meter for measuring carbon activity in liquid sodium comprising: means defining a first electrode and containing a molten electrolyte therein selected from the group consisting of (1) a mixture of $Na_2CO_3$, $K_2CO_3$ and $Li_2CO_3$ and (2) $CaCl_2 + CaC_2$, said first electrode means comprising a cup shaped member constructed of nickel and containing said electrolyte in the lower portion thereof, said first electrode means having a thin film of gold covering at least the inner surface thereof in contact with said electrolyte for preventing corrosion of said nickel by said electrolyte, means defining a second electrode positioned at least partially within said first electrode means and including a closed end portion surrounded by said electrolyte, said second electrode means comprising a tubular shaped member constructed of nickel and positioned within said cup shaped member in spaced relation therewith, said second electrode means having a thin film of gold covering at least the outer surface thereof in contact with said electrolyte for preventing corrosion of said nickel by said electrolyte, electrical insulator means composed of material selected from the group consisting of quartz and magnesia positioned intermediate said first and second electrode means, means connected to said first electrode means for controllably supplying a cover gas above said electrolyte, seal means positioned to prevent cover gas leakage between said first and second electrode means, means for controllably supplying a reference gas interior of and adjacent to said closed end portion of said second electrode means including a capillary tube means extending into said second electrode means and terminating at one end thereof in spaced relation with respect to said closed end portion of said second electrode means, said capillary tube means having the other end thereof connected to a valved conduit means for controllably supplying reference gas thereto, seal means positioned to prevent leakage of said reference gas from said second electrode means, means connected to said second electrode means in spaced relation with respect to said closed end portion thereof for controllably discharging said reference gas therefrom, and means electrically connected to said first and second electrode means for measuring the electrochemical potential therebetween.

2. The meter defined in claim 1, wherein said capillary tube is constructed of quartz.

* * * * *